(12) United States Patent
Wang et al.

(10) Patent No.: US 11,295,642 B2
(45) Date of Patent: Apr. 5, 2022

(54) THREE-DIMENSIONAL IMAGE DISPLAY SYSTEM

(71) Applicant: BOE TECHNOLOGY GROUP CO., LTD., Beijing (CN)

(72) Inventors: Kaifeng Wang, Beijing (CN); Tuo Sun, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 81 days.

(21) Appl. No.: 16/836,386

(22) Filed: Mar. 31, 2020

(65) Prior Publication Data

US 2021/0125532 A1    Apr. 29, 2021

(30) Foreign Application Priority Data

Oct. 28, 2019    (CN) .......................... 201911032537.5

(51) Int. Cl.
*G09G 3/00*    (2006.01)
*H04N 13/393*    (2018.01)

(52) U.S. Cl.
CPC ........... *G09G 3/003* (2013.01); *H04N 13/393* (2018.05)

(58) Field of Classification Search
CPC ...... G09G 3/003; G09G 3/005; H04N 13/393; G02B 30/54
USPC .......................... 348/42, 51, 52, 54; 345/419
See application file for complete search history.

(56) References Cited

U.S. PATENT DOCUMENTS

| 9,942,539 B2 | 4/2018 | Tait et al. |
| 2011/0096071 A1* | 4/2011 | Okamoto ............. H04N 13/398 345/419 |
| 2013/0003020 A1 | 1/2013 | Koehler et al. |

(Continued)

FOREIGN PATENT DOCUMENTS

| CN | 101738731 A | * | 6/2010 |
| CN | 101738731 A | | 6/2010 |
| CN | 102854738 A | | 1/2013 |

(Continued)

OTHER PUBLICATIONS

Machine translation of CN 108919501 A (Year: 2018).*

(Continued)

*Primary Examiner* — Christopher S Kelley
*Assistant Examiner* — Ana Picon-Feliciano
(74) *Attorney, Agent, or Firm* — Brooks Kushman P.C.

(57) ABSTRACT

A three-dimensional image display system includes: a vapor generating component, a rotating component, a shell, a lens component, a support component and a display device; where the vapor generating component is configured to control an vapor ejection from an air outlet; the rotating component is configured to drive a rotating disk of the rotating component to rotate at a preset refresh frequency and control a nozzle on the rotating disk to eject vapor to form a vapor column; the display device includes a plurality of columns of pixel units, and one column of pixel units corresponding to the vapor column is configured to display three-dimensional image data when receiving the three-dimensional image data; the lens component includes a plurality of lenses, and each lens is configured to focus light emitted by a corresponding pixel unit, to form a real image at an image plane at the vapor column.

13 Claims, 5 Drawing Sheets

(56) References Cited

U.S. PATENT DOCUMENTS

2016/0259298 A1   9/2016  Farringdon
2017/0161943 A1   6/2017  Lam et al.

FOREIGN PATENT DOCUMENTS

| | | | |
|---|---|---|---|
| CN | 108181714 A | | 6/2018 |
| CN | 108919501 A | * | 11/2018 |
| CN | 108919501 A | | 11/2018 |
| CN | 208888570 U | | 5/2019 |
| CN | 209000248 U | | 6/2019 |
| TW | I524093 B | | 3/2016 |

OTHER PUBLICATIONS

Machine translation of CN 101738731 A (Year: 2010).*
First Office Action for Chinese Application No. 201911032537.5, dated Mar. 25, 2021, 9 Pages.

\* cited by examiner

THREE-DIMENSIONAL IMAGE DISPLAY SYSTEM

CROSS-REFERENCE TO RELATED APPLICATION

This application claims priority to Chinese Patent Application No. 201911032537.5 filed on Oct. 28, 2019, which is incorporated herein by reference in its entirety.

TECHNICAL FIELD

The present disclosure relates to the field of three-dimensional display technology, and in particular to a three-dimensional image display system.

BACKGROUND

The three-dimensional display technology in the related technology is to display different content at different positions or angles, and then use the visual difference between the left and right eyes of the user to realize three-dimensional display, and use the illusion of the user's vision to virtually create a three-dimensional image. However, the above-mentioned three-dimensional image is not a true three-dimensional image. It may be affected by the difference in the user's eyesight (e.g., one of the eyes is hurt). The three-dimensional image cannot be reproduced, which affects the user's viewing experience.

SUMMARY

A three-dimensional image display system is provided in the embodiment of the present disclosure, including:

a vapor generating component, a rotating component on the vapor generating component, a shell above a rotating disk in the rotating component, a lens component outside the shell, a support component above the rotating disk and in the shell and a display device on the support component;

where the vapor generating component is configured to control a vapor ejection from an air outlet;

the rotating component is configured to drive a rotating disk of the rotating component to rotate at a preset refresh frequency and control a nozzle on the rotating disk to eject vapor to form a vapor column;

the display device includes a plurality of columns of pixel units, and one column of pixel units corresponding to the vapor column is configured to display three-dimensional image data when receiving the three-dimensional image data;

the lens component includes a plurality of lenses, and each lens is configured to focus light emitted by a corresponding pixel unit, to form a real image at an image plane at the vapor column; and the rotating component is further configured to drive the display device to rotate at the refresh frequency.

Optionally, the lenses include at least one of a convex lens, a convex lens array and a liquid crystal lens.

Optionally, the lenses are made of at least one of glass, quartz and polymer in the case that the lenses each is the convex lens or the convex lens array.

Optionally, each pixel unit corresponds to a plurality of convex lenses on the convex lens array in the case that the lenses each is the convex lens array.

Optionally, a focal length of each lens is:

$$f = \sqrt{(A-B)^2 + d^2} \times \cos\left[\arctan\left(\frac{A-B}{d}\right) + \theta\right];$$

where A is a height of an image point, B is a height of an optical center, θ is a tilt angle of an array substrate where a pixel is located, d is a distance from the image point to an image plane, and f is a focal length of a lens;

an edge of one side of each lens is aligned with a corresponding pixel edge, and a distance k from the optical center to the pixel is:

$$k = \sqrt{(A-B)^2 + d^2} \times \sin\left[\arctan\left(\frac{A-B}{d}\right) + \theta\right].$$

Optionally, a focal length of each lens is:

$f = d/(m+1)$;

a distance between a pixel and a lens is:

$l = d/m$;

an edge of one side of each lens is aligned with an edge of the pixel, and a distance from an optical center to the pixel is:

$k = (A-B)/m$ where A is a height of an image point, B is a height of an optical center, d is a distance from an image point to an image plane, f is a focal length of the lens, and m is an image magnification ratio.

Optionally, a preset number of pixel units along a rotation direction are configured to receive a same image data, and optical parameters of the lenses of the pixel units are different.

Optionally, the vapor generating component includes a gas cavity and a plurality of columns of air outlets arranged on an upper surface of the gas cavity; the air outlets in each column are arranged in a radial direction, and distances from respective air outlets in each column to a central axis of the display device are different from each other.

Optionally, a plurality of nozzles are on the rotating disk, the plurality of nozzles are on both sides of a set reference line, a distance between respective nozzle on each side of the set reference line and a center point of the rotating disk increases along a direction of rotation.

Optionally, the three-dimensional image display system further includes: a driving component;

where the driving component is configured to decompose an obtained original image, reconstruct three-dimensional image data based on the decomposed original image data, and provide the three-dimensional image data to the display device.

A method of driving a three-dimensional image display system is further provided in the embodiment of the present disclosure, applied to the three-dimensional image display system mentioned above, including:

obtaining an original image;

decomposing the obtained original image to generate decomposed data;

reconstructing three-dimensional image data based on the decomposed data; and providing the three-dimensional image data to the display device.

BRIEF DESCRIPTION OF THE DRAWINGS

To better clarify technical solutions of embodiments of the present disclosure, drawings used in description of the embodiments are briefly introduced hereinafter. Apparently, the described drawings merely illustrate a part of the disclosed embodiments. A person of ordinary skill in the art can obtain other drawings based on the described drawings without any creative efforts.

DETAILED DESCRIPTION

To describe the objective, the technical solutions and the advantages of embodiments of the present disclosure more clearly, the technical solutions in embodiments of the present disclosure are described clearly and completely in conjunction with drawings in the embodiments of the present disclosure. Apparently, the described embodiments are merely a part of rather than all the embodiments of the present disclosure. All other embodiments obtained by a person of ordinary skill in the art based on the described embodiments of the present disclosure fall within the scope of the present disclosure.

The three-dimensional display technology in the related technology is to display different content at different positions or angles, and then use the visual difference between the left and right eyes of the user to realize three-dimensional display, and use the illusion of the user's vision to virtually create a three-dimensional image. However, the above-mentioned three-dimensional image is not a true three-dimensional image. It may be affected by the difference in the user's eyesight (e.g., one of the eyes is hurt). The three-dimensional image cannot be reproduced, which affects the user's viewing experience.

Figure 1:
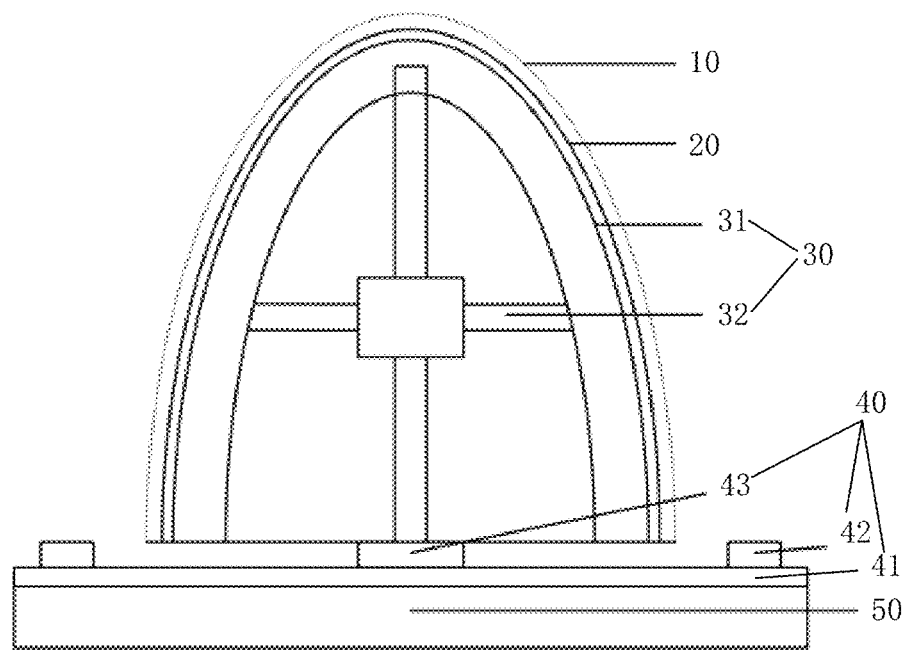
FIG. 1 is a cross-sectional view of a three-dimensional image display system in an embodiment of the present disclosure.

To solve the above technical issues, a three-dimensional image display system is provided in an embodiment of the present disclosure, referring to FIG. 1, the three-dimensional image display system includes: a vapor generating component 50, a rotating component 40 on the vapor generating component 50, a shell 10 above a rotating disk 41 in the rotating component 40, a lens component (not shown in FIG. 1) outside the shell 10, a support component 30 above the rotating disk 41 and in the shell 10 and a display device 20 on the support component 30.

The vapor generating component 50 is configured to control an vapor ejection from an air outlet;

the rotating component 40 is configured to drive a rotating disk 41 of the rotating component to rotate at a preset refresh frequency and control a nozzle 42 on the rotating disk to eject vapor to form a vapor column;

the display device 20 includes a plurality of columns of pixel units, and one column of pixel units corresponding to the vapor column is configured to display three-dimensional image data when receiving the three-dimensional image data;

the lens component includes a plurality of lenses, and each lens is configured to focus light emitted by a corresponding pixel unit, to form a real image at an image plane at the vapor column; and the rotating component 40 is further configured to drive the display device 20 to rotate at the refresh frequency.

Figure 2A:
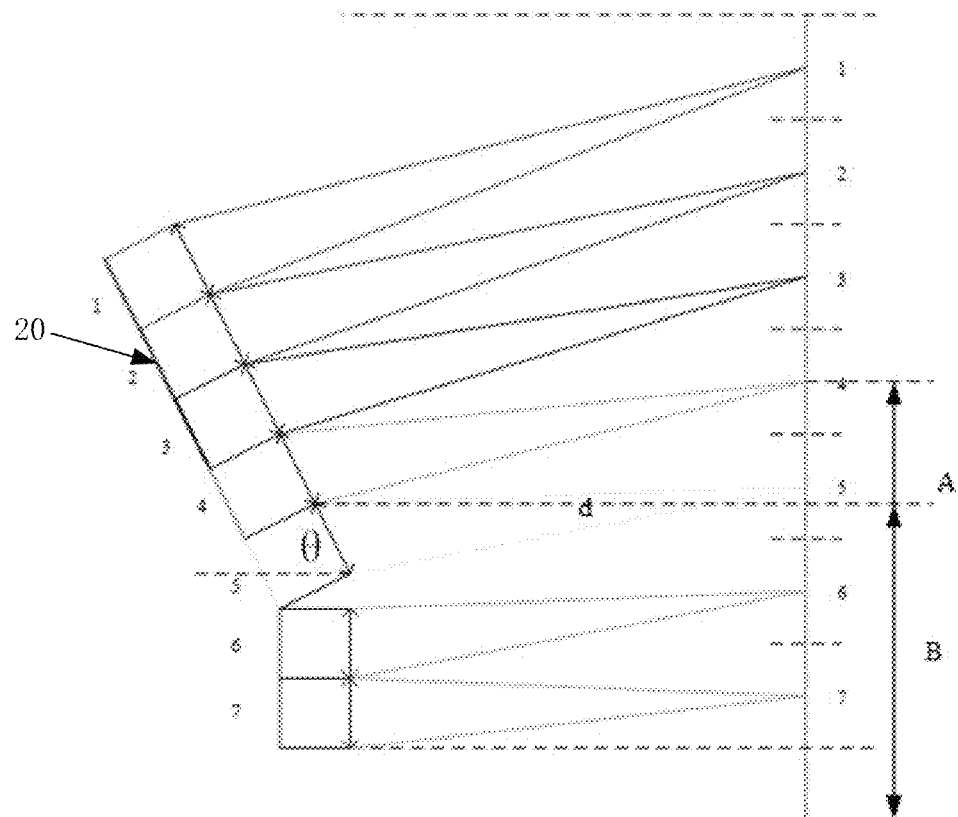
FIG. 2A is a schematic diagram of a lens imaging optical path in an embodiment of the present disclosure.

In an embodiment, referring to FIG. 2A, the focal position and shape of the convex lens can be adjusted to control the focus position of the parallel light emitted from the pixel unit and then the convergent light can be displayed by scattering. Wherein a focal length of each lens is:

$$f = \sqrt{(A-B)^2 + d^2} \times \cos\left[\arctan\left(\frac{A-B}{d}\right) + \theta\right];$$

where A is a height of an image point, B is a height of an optical center 23, θ is a tilt angle of an array substrate where a pixel is located, d is a distance from the image point to an image plane, and f is a focal length of a lens;

an edge of one side of each lens is aligned with a corresponding pixel edge, and a distance k from the optical center to the pixel is:

$$k = \sqrt{(A-B)^2 + d^2} \times \sin\left[\arctan\left(\frac{A-B}{d}\right) + \theta\right].$$

Figure 2B:
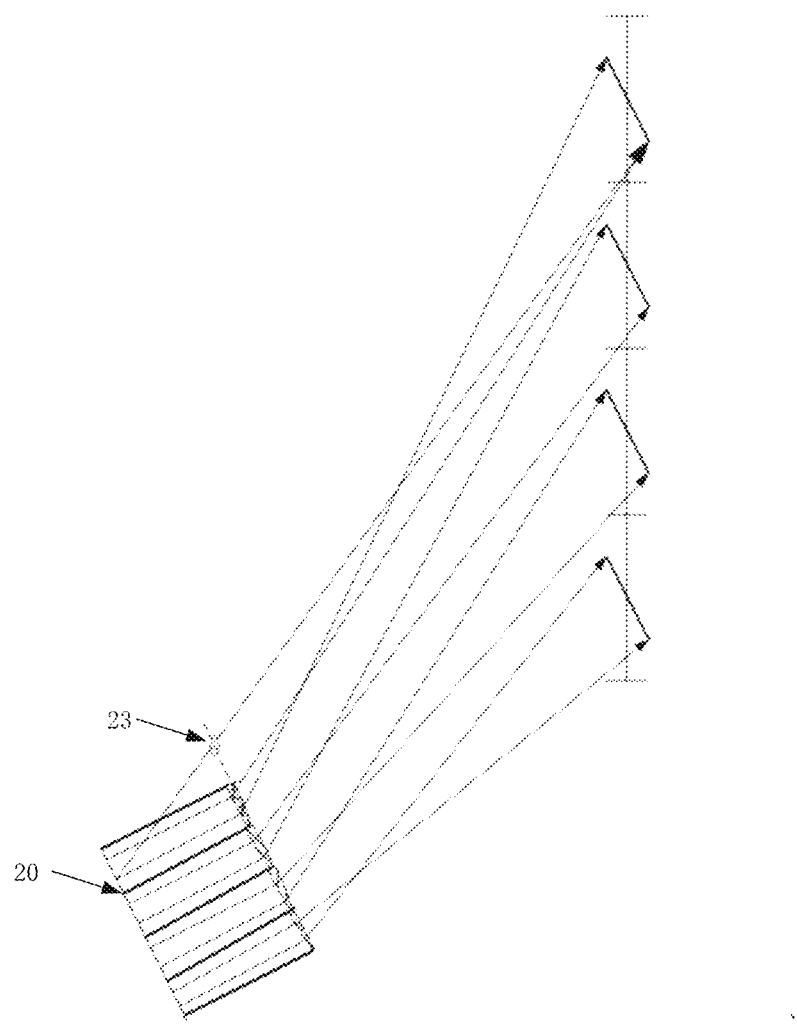
FIG. 2B is a schematic diagram of another lens imaging optical path in an embodiment of the present disclosure.

In another embodiment, referring to FIG. 2B, the position of the focal point and optical center of each lens can be adjusted, so that the pixel can obtain an enlarged real image near the image plane. A focal length of each lens is:

$f=d/(m+1)$;

a distance between a pixel and a lens is:

$l=d/m$;

an edge of one side of each lens is aligned with an edge of the pixel, and a distance from an optical center to the pixel is:

$k=(A-B)/m$;

where A is a height of an image point, B is a height of an optical center, d is a distance from an image point to an image plane, f is a focal length of the lens, and m is an image magnification ratio.

It should be noted that if a convex lens array is used as the lens, a pixel unit on the display device 20 may correspond to a plurality of convex lenses, and the positions of the focal points and optical centers of the plurality of convex lenses are calculated in the same manner as in the above mentioned embodiment. This will not be repeated here.

In some embodiments of the present disclosure, a preset number (for example, 4, 9, or 16) of adjacent pixel units along the rotation direction may be set to display the same image. Because the lenses corresponding to these pixel units are different and the positions of each lens are different, the optical parameters (such as focal length and shape) of each lens are different. The points where the emitting light of these pixels converge are on the same plane, but not in the same position, which can expand the display area. Due to the vapor scattering halo effect and the limited distance resolution of the human eye, it can approximately form a continuous picture and improve the visual effect.

Figure 3:
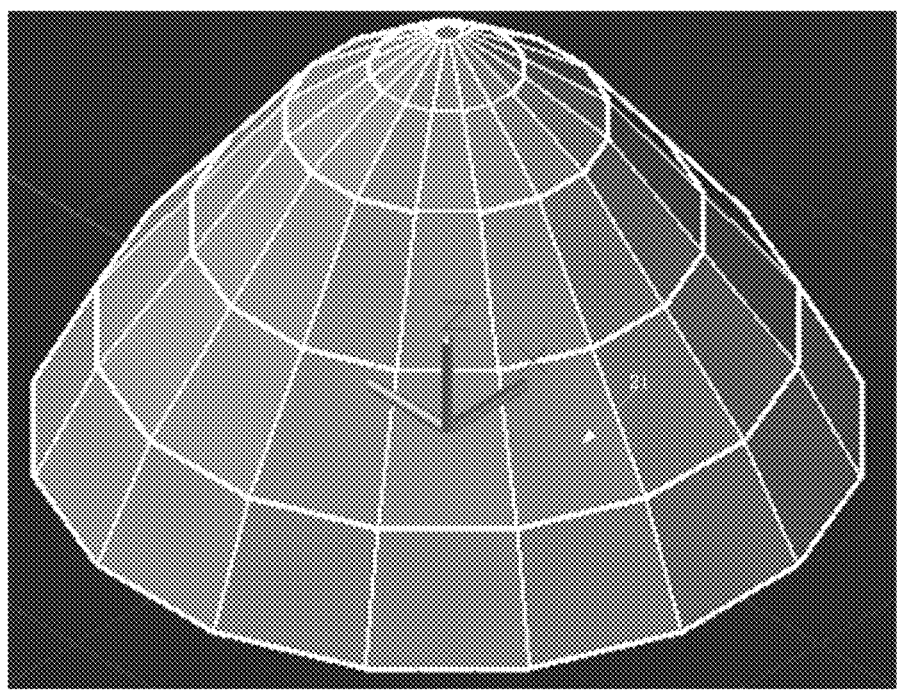
FIG. 3 is a side view of a display device assembly structure in an embodiment of the present disclosure.
Figure 4:
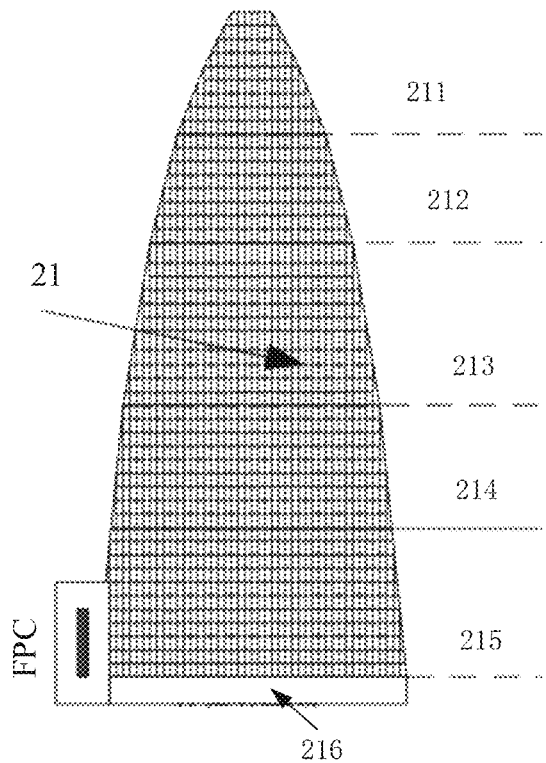
FIG. 4 is an expanded schematic diagram of an assembly unit in a display device in an embodiment of the present disclosure.

In some embodiments of the present disclosure, the display device 20 is a display panel. Referring to FIG. 3, the display panel has a polyhedron shape and includes a plurality of layers with different inclination angles. Taking the column direction as an example, one of the assembly units "lobes" of the display panel is shown in FIG. 4. Referring to FIG. 4, the display panel includes five layers with different inclination angles, that is, from top to bottom: first layer 211, second layer 212, third layer 213, fourth layer 214, and fifth layer 215. The display panel may be driven by a driving device at the row driving area 216. The driving device may be a gate driving unit (GOA), a row scanning chip, etc., and the image data may be written into a flexible printed circuit (FPC), or it is implemented by other driving circuits. The driving devices will be described in detail later, and will not be described here.

In some embodiments of the present disclosure, the light-emitting time of each pixel unit is about 114 microseconds, so micro-LEDs, Mini LEDs, OLEDs, or QLEDs with higher brightness can be used to achieve the writing of image data. Specifically, by means of driving a pixel unit in a time-sharing manner by two sets of pixel circuits, the writing time can be controlled, thereby achieving the writing of image data. It should be noted that the pixel unit may adopt different resolutions and different sizes according to different shell curvatures, and the corresponding solutions fall within the scope of the present disclosure.

Figure 5:
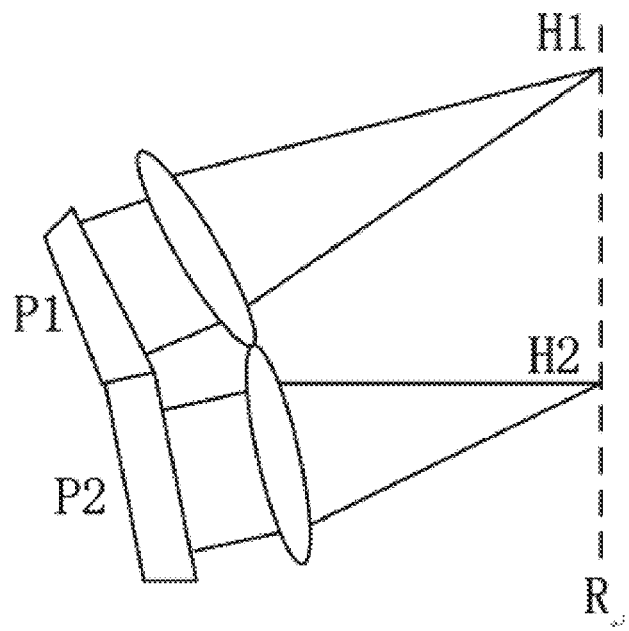
FIG. 5 is a schematic diagram of the effect of converging light by lens corresponding to pixels in a same column in an embodiment of the present disclosure.
Figure 6:
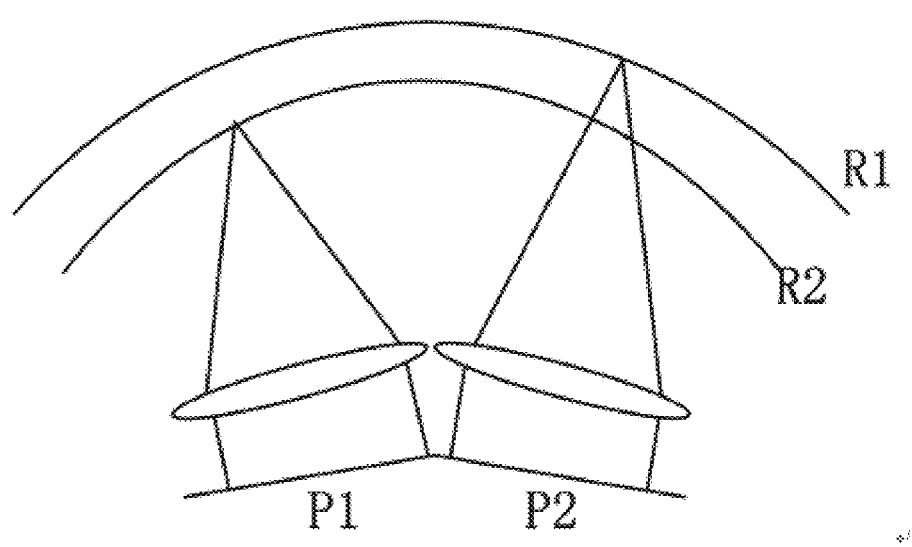
FIG. 6 is a schematic diagram of the effect of converging light by lens corresponding to pixels in a same row in an embodiment of the present disclosure.

In some embodiments of the present disclosure, each column of pixel units in the display device 20 is converged on a straight line parallel to the central axis (i.e., the rotation axis) of the rotating component through a lens on the shell 10, and the effect is shown in FIG. 5. Referring to FIG. 5, the light emitted when the pixel 1 displays the image is projected to the position H1 of the straight line R through the lens, and the light emitted when the pixel 2 displays the image is projected to the position H2 of the straight line R through the lens. In addition, the pixel units in the same row are converged to the positions at different distances from the rotation axis through the lens on the shell 10, and the effect is shown in FIG. 6. Referring to FIG. 6, light emitted when the pixel 1 displays an image is projected onto a straight line R2 through a lens, and light emitted when the pixel 3 displays an image is projected onto a straight line R3 through a lens.

That is to say, In some embodiments of the present disclosure, each column of pixel units is responsible for displaying one cylindrical surface in a three-dimensional space, and n columns of pixel units may be responsible for displaying n cylindrical surfaces in a three-dimensional space. In this way, during the high-speed (preset refresh frequency) rotation of the rotation axis at work, the pixel units of each column realize the display of each cylindrical surface by switching to the brightness of the sub-image of the corresponding column in the original image, and then combine them into a three-dimensional object.

In some embodiments of the present disclosure, a lens is disposed on the shell 10, and the lens may include one of the following: a convex lens, a convex lens array, and a liquid crystal lens. If the lens is a convex lens or a convex lens array, it is made of at least one of the following materials: glass, quartz, and polymer. Of course, a technician can select an optical device with a light converging effect to replace the lens according to a specific scene, and the corresponding solution falls within the scope of the present disclosure.

In some embodiments of the present disclosure, with continued reference to FIG. 1, the support component 30 may include a support body 31 and a support rod 32, and the support body 31 is fixed on the support rod 32. The support body 31 is used for supporting the display device 20 and serves as a force transmission medium for the display device 20 to rotate. The support rod 32 is fixed on the rotating component 40, and when the rotating component 40 rotates, it rotates with the rotating component 40, so that the support body 31 rotates; accordingly, the supporting body 32 can drive the display device 20 to rotate. FIG. 1 shows the structure of the support body 31 as a cone, and the structure of the support rod 32 as a rod body. It can be understood that, to simplify the design or when the driving force of the rotating parts is sufficient, the support component 30 may be provided as a solid cone, and can be disposed on the surface of the solid cone on the display device 20. And the solutions of the present disclosure can also be implemented, and the corresponding solutions fall into the scope of the present disclosure.

Figure 7:
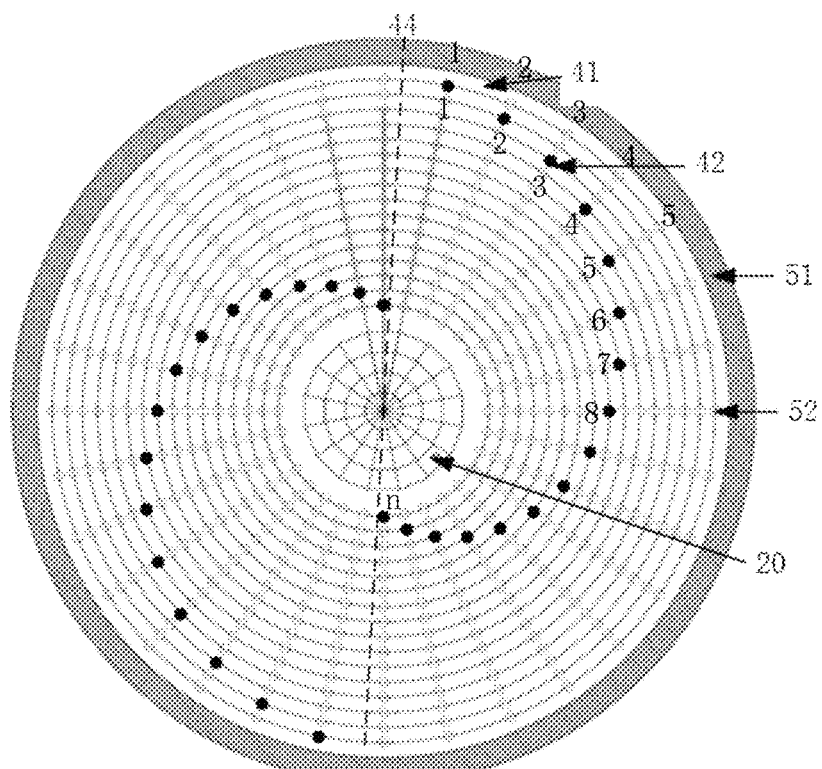
FIG. 7 is a top view of a three-dimensional image display system in an embodiment of the present disclosure.
Figure 8:
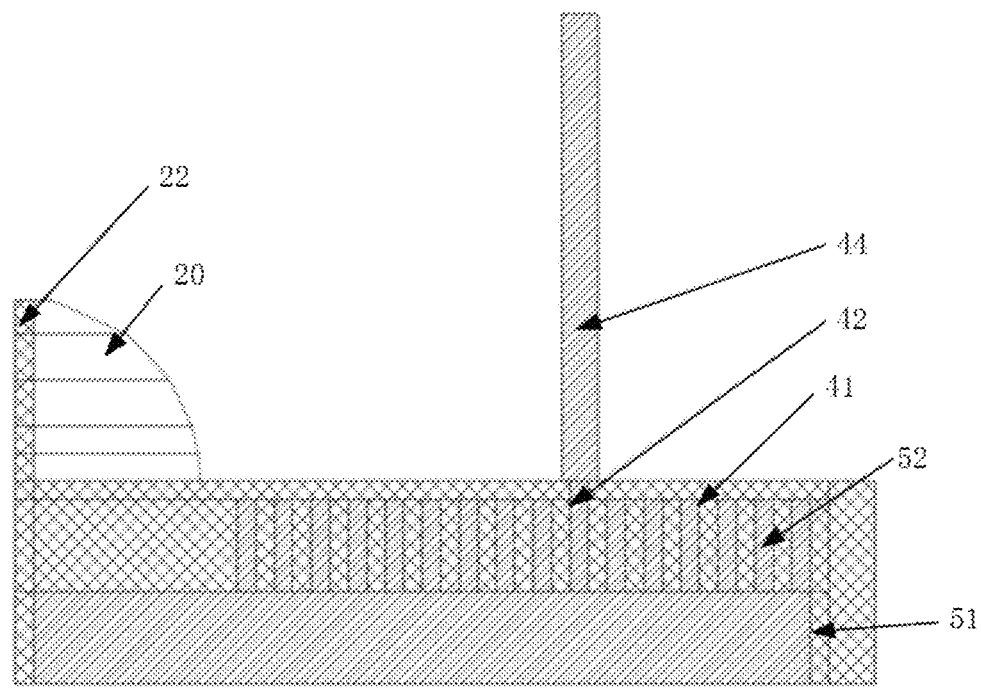
FIG. 8 a cross-sectional view of a three-dimensional image display system in an embodiment of the present disclosure.

In some embodiments of the present disclosure, referring to FIG. 7 and FIG. 8, the rotating component 40 includes a rotating disk 41, a plurality of nozzles 42 provided on the rotating disk 41, and a rotating motor 43.

A plurality of nozzles 42 are on both sides of a set reference line 44, a distance between respective nozzle 42 on each side of the set reference line and a center point of the rotating disk increases along a direction of rotation. In other words, along the rotation direction of the rotating motor 43, the distance of each nozzle from the center point in the radial direction gradually increases, so that air columns with different distances from the center point can be formed. When the rotation speed of the rotating disk 41 is equal to the refresh frequency of the image data, a vapor cylinder appears in the human eyes due to the visual stagnation phenomenon.

It should be noted that the shape of the nozzle 42 may include one of the following: circular, square, or fan-shaped, and each solution falls within the protection scope of the present disclosure if the inner diameter of the vapor gas column meets the requirements.

In some embodiments of the present disclosure, the vapor generating component 50 is used to control the vapor ejection from the air outlet. Referring to FIG. 7 and FIG. 8, the vapor generating component 50 includes a gas cavity 51 and a plurality of air holes 52 provided on the upper surface of the gas cavity 51. The air holes are arranged in a radial direction, and the distance between each air hole in each column and the central axis 22 of the display device 20 is different. After the nozzle 42 is aligned with the air outlet 52, vapor gas can be sprayed to form vapor gas columns with different radii.

In some embodiments of the present disclosure, the three-dimensional image display system may further include a driving component (not shown in the figure). The driving component is configured to decompose an obtained original image, reconstruct three-dimensional image data based on the decomposed original image data, and provide the three-dimensional image data to the display device 20. The original image may be collected by multiple cameras outside or inside the three-dimensional image display system. Each original image include information such as color, brightness, and/or spatial position, which is not limited herein.

It should be noted that, because the original image is formed in accordance with the arrangement order of the sensing units in the light sensor of the camera, considering that the display device 20 is displayed in a row or column manner, a frame of the original image may be first decomposed into multiple columns of sub-images; For each column of sub-images, according to the spatial position of each pixel in the sub-image, the spatial position relationship of the display unit, and the spatial position relationship of the cylindrical surface, the sub-image is decomposed into sub-image blocks at various depths, where the depth refers to the distance between the vapor gas column and the central axis of the display device 20. In this way, each column of sub-images may form a sub-image block set. In other words, in some embodiments of the present disclosure, by reconstructing the original image, it can be determined which cylindrical surface each pixel in the original image is located on.

Continuing to refer to FIG. 7, taking the counterclockwise rotating of the rotating disk and the displaying n-column of a frame of original image as an example, when the nozzle 1 is located at position 1, the first column of pixel units in the display device 20 displays the sub-image blocks of the first depth in the first column of sub-images. Due to the rotation of the rotating disk 41, the nozzle 1 moves out of position 1, and the nozzle 2 moves into position 1. When the nozzle 2 is located at the position 1, the second column of pixel units in the display device 20 display the sub-image blocks of the second depth in the first column of sub-images. When the nozzle 3 is moved to position 1, the third column of pixel units in the display device 20 display the sub-image blocks of the third depth in the first column of sub-images; . . . , and so on. When the nozzle n is moved to position 1, the nth column of pixel units display the sub-image blocks of the n-th depth in the first column of sub-images. In this way, during one rotation, the sub-image blocks of the n-depth in the first column of sub-images in the original image are sequentially displayed by the n-column display units in the display device 20, respectively.

Similarly, based on the above-mentioned display principle of the first column of sub-images, the second column of sub-images can be displayed at position 2, . . . , and the n-th column of sub-images can be displayed at position n. In this way, in some embodiments of the present disclosure, one frame of the original image can be displayed. Furthermore, in combination with a preset refresh frequency, the same frame image can be refreshed multiple times, and combined with the visual stagnation phenomenon of the human eye, the user can view the three-dimensional image.

In some embodiments of the present disclosure, a three-dimensional image is displayed by a display device, and the image is projected by a lens component onto a vapor column at different focal lengths, and the vapor is used to scatter light; combined with the visual stagnation phenomenon, human eyes can achieve visual reproduction of three-dimensional images.

A method of driving a three-dimensional image display system is further provided in the embodiment of the present disclosure, applied to the three-dimensional image display system hereinabove, including: obtaining an original image; decomposing the obtained original image to generate decomposed data; reconstructing three-dimensional image data based on the decomposed data; providing the three-dimensional image data to the display device.

Unless otherwise defined, the technical or scientific terms used in the present disclosure shall have the ordinary meanings understood by those of ordinary skill in the art to which the present disclosure belongs. The terms "first", "second", and the like used in this disclosure do not indicate any order, quantity, or priority, but are only configured to distinguish different components. Expressions such as "connection" or "connected" are not limited to denote physical or mechanical connections, but may include electrical connections, whether direct or indirect. "Up", "down", "left", "right", etc. are only configured to indicate the relative position relationship. When the absolute position of the described object changes, the relative position relationship changes accordingly.

The above descriptions merely describe optional implementations of the present disclosure. It is appreciated, modifications and improvements may be made by a person of ordinary skill in the art without departing from the principle of the present disclosure, and these modifications and improvements shall fall within the scope of the present disclosure.

What is claimed is:

1. A three-dimensional image display system, comprising:
a vapor generating component, a rotating component on the vapor generating component, a shell above a rotating disk in the rotating component, a lens component outside the shell, a support component above the rotating disk and in the shell and a display device on the support component;
wherein the vapor generating component is configured to control a vapor ejection from an air outlet;
the rotating component is configured to drive a rotating disk of the rotating component to rotate at a preset refresh frequency and control a nozzle on the rotating disk to eject vapor to form a vapor column;
the display device comprises a plurality of columns of pixel units, and one column of pixel units corresponding to the vapor column is configured to display three-dimensional image data when receiving the three-dimensional image data;
the lens component comprises a plurality of lenses, and each lens is configured to focus light emitted by a corresponding pixel unit, to form a real image at an image plane at the vapor column; and
the rotating component is further configured to drive the display device to rotate at the refresh frequency,
wherein the vapor generating component comprises a gas cavity and a plurality of columns of air outlets arranged on an upper surface of the gas cavity; the air outlets in each column are arranged in a radial direction, and distances from respective air outlets in each column to a central axis of the display device are different from each other.

2. The three-dimensional image display system according to claim 1, wherein the lenses comprise at least one of a convex lens, a convex lens array and a liquid crystal lens.

3. The three-dimensional image display system according to claim 2, wherein the lenses are made of at least one of glass, quartz and polymer in the case that the lenses each is the convex lens or the convex lens array.

4. The three-dimensional image display system according to claim 2, wherein each pixel unit corresponds to a plurality of convex lenses on the convex lens array in the case that the lenses each is the convex lens array.

5. The three-dimensional image display system according to claim 1, wherein a focal length of each lens is:

$$f = \sqrt{(A-B)^2 + d^2} \times \cos\left[\arctan\left(\frac{A-B}{d}\right) + \theta\right];$$

wherein A is a height of an image point, B is a height of an optical center, θ is a tilt angle of an array substrate where a pixel is located, d is a distance from the image point to an image plane, and f is a focal length of a lens;

an edge of one side of each lens is aligned with a corresponding pixel edge, and a distance k from the optical center to the pixel is:

$$k = \sqrt{(A-B)^2 + d^2} \times \sin\left[\arctan\left(\frac{A-B}{d}\right) + \theta\right].$$

6. The three-dimensional image display system according to claim 1, wherein a focal length of each lens is:

$f=d/(m+1)$;

a distance between a pixel and a lens is:

$l=d/m$;

an edge of one side of each lens is aligned with an edge of the pixel, and a distance from an optical center to the pixel is:

$k=(A-B)/m$;

wherein A is a height of an image point, B is a height of an optical center, d is a distance from an image point to an image plane, f is a focal length of the lens, and m is an image magnification ratio.

7. The three-dimensional image display system according to claim 1, wherein a preset number of pixel units along a rotation direction are configured to receive a same image data, and optical parameters of the lenses of the pixel units are different.

8. The three-dimensional image display system according to claim 1, wherein a plurality of nozzles are on the rotating disk, the plurality of nozzles are on both sides of a set reference line, a distance between respective nozzle on each side of the set reference line and a center point of the rotating disk increases along a direction of rotation.

9. The three-dimensional image display system according to claim 1, further comprising: a driving component;

wherein the driving component is configured to decompose an obtained original image, reconstruct three-dimensional image data based on the decomposed original image data, and provide the three-dimensional image data to the display device.

10. A method of driving a three-dimensional image display system, applied to the three-dimensional image display system according to claim 1, comprising:

obtaining an original image;

decomposing the obtained original image to generate decomposed data;

reconstructing three-dimensional image data based on the decomposed data; and providing the three-dimensional image data to the display device.

11. The three-dimensional image display system according to claim 3, wherein each pixel unit corresponds to a plurality of convex lenses on the convex lens array in the case that the lenses each is the convex lens array.

12. A three-dimensional image display system, comprising:

a vapor generating component, a rotating component on the vapor generating component, a shell above a rotating disk in the rotating component, a lens component outside the shell, a support component above the rotating disk and in the shell and a display device on the support component;

wherein the vapor generating component is configured to control a vapor ejection from an air outlet;

the rotating component is configured to drive a rotating disk of the rotating component to rotate at a preset refresh frequency and control a nozzle on the rotating disk to eject vapor to form a vapor column;

the display device comprises a plurality of columns of pixel units, and one column of pixel units corresponding to the vapor column is configured to display three-dimensional image data when receiving the three-dimensional image data;

the lens component comprises a plurality of lenses, and each lens is configured to focus light emitted by a corresponding pixel unit, to form a real image at an image plane at the vapor column; and the rotating component is further configured to drive the display device to rotate at the refresh frequency, wherein a focal length of each lens is:

$$f = \sqrt{(A-B)^2 + d^2} \times \cos\left[\arctan\left(\frac{A-B}{d}\right) + \theta\right];$$

wherein A is a height of an image point, B is a height of an optical center, θ is a tilt angle of an array substrate where a pixel is located, d is a distance from the image point to an image plane, and f is a focal length of a lens;

an edge of one side of each lens is aligned with a corresponding pixel edge, and a distance k from the optical center to the pixel is:

$$k = \sqrt{(A-B)^2 + d^2} \times \sin\left[\arctan\left(\frac{A-B}{d}\right) + \theta\right].$$

13. A three-dimensional image display system, comprising:

a vapor generating component, a rotating component on the vapor generating component, a shell above a rotating disk in the rotating component, a lens component outside the shell, a support component above the rotating disk and in the shell and a display device on the support component;

wherein the vapor generating component is configured to control a vapor ejection from an air outlet;

the rotating component is configured to drive a rotating disk of the rotating component to rotate at a preset refresh frequency and control a nozzle on the rotating disk to eject vapor to form a vapor column;

the display device comprises a plurality of columns of pixel units, and one column of pixel units corresponding to the vapor column is configured to display three-dimensional image data when receiving the three-dimensional image data;

the lens component comprises a plurality of lenses, and each lens is configured to focus light emitted by a corresponding pixel unit, to form a real image at an image plane at the vapor column; and the rotating component is further configured to drive the display device to rotate at the refresh frequency, wherein a plurality of nozzles are on the rotating disk, the plurality of nozzles are on both sides of a set reference line, a distance between respective nozzle on each side of the set reference line and a center point of the rotating disk increases along a direction of rotation.

\* \* \* \* \*